United States Patent [19]

Färber

[11] Patent Number: 4,564,317

[45] Date of Patent: Jan. 14, 1986

[54] SILO FOR STORING SOLIDIFYING LOOSE MATERIAL, ESPECIALLY FLUE DUST

[75] Inventor: Ernst-Ove Färber, Hensted-Ulzburg, Fed. Rep. of Germany

[73] Assignee: Claudius Peters, Fed. Rep. of Germany

[21] Appl. No.: 535,035

[22] Filed: Sep. 23, 1983

[30] Foreign Application Priority Data

Nov. 8, 1982 [DE] Fed. Rep. of Germany ....... 3241150

[51] Int. Cl.$^4$ ............................................. B65G 53/48
[52] U.S. Cl. ...................................... 406/56; 414/317; 414/319
[58] Field of Search ........................... 406/55, 56, 138; 414/288, 313, 311, 321, 317, 319, 320

[56] References Cited

U.S. PATENT DOCUMENTS

| | | | |
|---|---|---|---|
| 1,711,574 | 5/1929 | Miller | 406/138 X |
| 2,605,692 | 8/1952 | Kranick | 414/321 X |
| 2,834,720 | 5/1958 | Savoca | 406/55 X |
| 3,134,629 | 5/1964 | Weibull | 406/56 |
| 3,358,856 | 12/1967 | Weibull | 414/317 X |
| 4,487,542 | 12/1984 | Johanning et al. | 414/317 X |

FOREIGN PATENT DOCUMENTS

2003153 11/1969 France .................................. 414/317

*Primary Examiner*—Jeffrey V. Nase
*Attorney, Agent, or Firm*—Eric P. Schellin

[57] ABSTRACT

Silo for storing solidify loose material, especially flue ash, which has a conveyor which can be moved on the surface of the stored material and which feeds the material loosened there to a conveyor device located in the silo which brings it to an exit opening provided on the silo floor. This conveyor device is simply and effectively constructed in accordance with the invention by forming it by a falling series of aeration devices on an essentially vertical silo wall. This silo wall is advantageously the circumference of a column provided in the center of the silo. In a first embodiment the mechanically separated and pneumatically loosened material passes through slideless openings into the inner space in the column, from which it is removed at the bottom. In a second embodiment the aeration devices are arranged on the circumference of the column in such a compact series that they result in the formation of an emptying column which follows the column surface and is filled by material fluidized by aeration.

5 Claims, 2 Drawing Figures

SILO FOR STORING SOLIDIFYING LOOSE MATERIAL, ESPECIALLY FLUE DUST

FIELD OF THE INVENTION

The invention is relative to a silo for storing solidifying loose material, especially flue ash, with a conveyor which can move on the surface of the stored material for conveying material scraped or stripped off the surface to a conveyor device which is located in the silo and conveys the filling material to an exit opening on the silo floor.

BACKGROUND OF THE INVENTION

The flue ash which collects in coal power plants is used in the cement industry to produce ash cement. More flue ash accumulates in the winter months than in the summer months, while more cement is produced in the summer months than in the winter months. For this reason large silos must receive the ash production of the winter months so that it is avalable in the summer months. However, problems occur in the storage of flue ash, because flue ash is hygroscopic. Although it flows quite readily in a dry state when being stored, it solidifies so much after a certain storage time that it can hardly be economically returned to a flowable state with pneumatic means. Therefore, mechanical conveyors are used in known large-capacity silos for removing the ash which can be moved both radially and horizontally on the surface of the stored material on a carrier structure. These conveyors convey the material loosened from the surface from the outside to the center to a hollow control column where it is caught by a shovel scraper which revolves at the circumference of the column. The scraper then pushes the material circularly around the column until it can exit at one of the openings in the column to the hollow space in the column. Several openings are distributed over the height of the column, each of which is closed by a slide. These slides are opened in succession from the top down, depending on the degree of filling of the silo. When the silo is being filled, the slides are closed easily, so that the hollow space in the column is not completely filled.

The known arrangement has the disadvantage that the expense for the slides is great and that the wear on the shovel scraper which pushes the material circularly around the central column is very great, since flue ash is extremely abrasive.

SUMMARY OF THE INVENTION

The invention has the task of creating an arrangement which reduces or avoids the expense for the opening slides.

The invention solves this task as follows: The conveyor device which conveys the material from the surface to the exit opening at the silo floor is formed by a falling series of aeration devices provided on an essentially vertical silo wall.

The observation made above is true, that solidified flue ash can not be loosened by the customary aeration devices provided on the silo floor in a large-capacity silo to such an extent that the material will run out sufficiently freely. However, it is quite possible to make material located in the vicinity of aeration devices flowable again by means of aeration. This is at least possible if the aeration is performed initially for a brief period with a very strong superpressure. This measure would not suffice in the case of aeration devices located on the floor of a large-capacity silo. However, the invention is based on the determination that the material in the vicinity of the aeration devices located on the silo wall can be loosened to such an extent by them that first the material made flowable by aeration and later the material loosened by the mechanical conveying means working on the surface of the material and conveyed to that area can flow off.

It is especially advantageous if the aeration devices are arranged on the circumference of the known central column, around which a scraper runs. While in the known silos with a central column around which a scraper runs, the scraper works in solid material and is therefore exposed to corresponding wear, a pneumatically fluidized jacket develops according to the invention around the column in which jacket the scraper comes in contact only with material which behaves essentially like fluid with a little expenditure of force, for which reason the scraper is subjected to only little wear. Its task is, as in the known systems, to convey the material in the jacket area of the column to the circumferential position from which it can flow off.

It is advantageous if the series of aeration elements surrounds the column in a helix, whereby several aeration rows can be provided, e.g. three rows, each of which is staggered by 120°.

The invention essentially permits two possibilities for the falling conveying of the material either separately or in combination. In the one possibility the aeration devices on the circumference of the column form such an uninterrupted series that they form a channel of loosened material in the otherwise solid material, whereby the material fed in at the top of the mechanical conveying means flows off in a downward direction in this channel. The silo exit opening can then be provided at the foot of the column. Instead of this, the column wall can also have a passage opening near the floor to silo exit located inside the hollow column.

In this embodiment the conveying channel formed by the series of aeration devices is advantageously opened at the start of operation by cutting in the aeration devices in a falling and progressive fashion from the top to the bottom until a broken path of material is formed all the way through. The air pressure used is measured according to he qualities of the stored material in such a way that the material is broken up with sufficient surety. It is frequently not necessary to maintain this high pressure later in the operation, because it is then only a matter of keeping the mechanically loosened material subsequently flowing down from the top sufficiently flowable during its downward travel. A relatively weak aeration is generally sufficient for this. It can even be sufficient to load only a part of the aeration devices in the series with compressed air, leaving others unaerated.

According to the other possibility of the invention the downward travel of the material occurs inside the hollow column. To this end passage openings distributed over its height are provided, as is known, through which the material located in the silo area can pass into the hollow space in the column. In this instance the aeration devices can be provided according to the invention in the openings, i.e. in the soffits of the openings or in the direct vicinity of the openings. According to the invention a sufficient amount of air exits out into the silo area in such an arrangement to loosen up the materal located there at the start of operation and to create a fluidizing which diminishes the scraper friction in the jacket area of the column in which the scraper revolves during the subsequent operation. However, in order to improve the latter effect, the aeration devices can of course also be positioned exclusively or additionally at a distance from the passage openings at the column circumference.

In order that a sufficient loosening effect also occurs in the silo area at the start of operation when the aeration elements are arranged in or on the column openings, it is advantageous to cut in the aeration devices when the inner space in the column is full. Previously, the attempt was made to avoid filling the inner space in the column by means of the initially mentioned opening slides. It turns out, however, that filling the inner space in the column and a solidification of the material located there is not damaging if strong pneumatic loosening devices are provided in the inner space in the column according to the invention. They act inside the column on a comparatively very small cross-sectional area, so that their action can not be lost in an uncontrolled fashion at a distance as would be the case in the large silo.

If one wishes to avoid the filling of the hollow column and the solidification of the material therein within the scope of the invention, this can be accomplished avoiding the opening slides used to this end in the state of the art by first allowing the column to be filled by the free-flowing material and then, when the material in the main silo area has solidified to the extent that it does not flow any more when the inner space in the column is emptied, emptying the inner space in the column into the main silo area by transfer devices provided for this purpose.

The term "series of aeration devices" signifies in relation to the invention that in the embodiment in which a continuous fluidized conveying channel is to be created by the aeration devices, the aeration devices must follow each other sufficiently closely in a falling series. The creation of such a continuous channel can also be desirable when many passage openings are distributed over the height of the column, so that a plurality of such passage openings can be used simultaneously for receiving the material. However, setting the aeration devices provided on the column so compactly that a continuous conveying channel could be created in the silo area can be dispensed with if at least one passage opening is available for the material at such work level.

If part of the loose material arrives at the silo exit in a lumpy, solidified form in spite of the means of the invention, it can readily be broken up and made flowable again by known crushing devices.

If a worm pump is used for transporting the material taken out of the silo, i.e. a conveyor worm which feeds the loose material to a pneumatic convey line, it can be utilized in addition during the loading of the silo in the winter months by creating the possibility of emptying the inner space in the column from time to time before the loose material there has solidified. It is then reintroduced into the silo at the top via a simple distributing device.

These and further constructional and operational characteristics of the invention will be evident from the detailed description given hereinafter with reference to the figure of the accompanying drawing which illustrates preferred embodiments and alternatives by way of non-limiting examples.

DESCRIPTION OF THE PREFERRED EMBODIMENT

Figure 1:
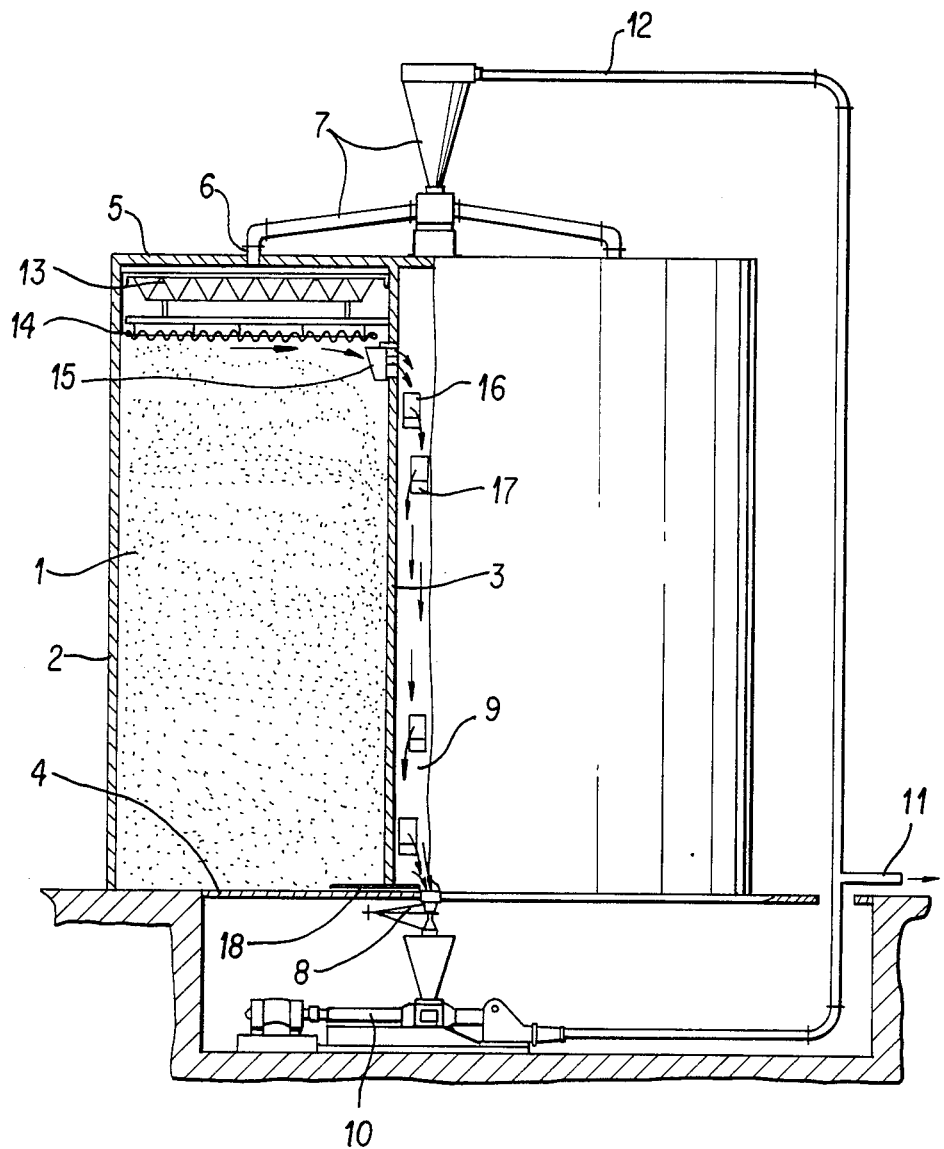
FIG. 1 shows a vertical center section through a silo, showing a first embodiment of the invention.

Referring now to the drawing wherein reference numerals are used to designate parts throughout the various figures thereof, there is shown in FIG. 1 silo main storage area 1 limited on the outside of cylindrical silo wall 2 and on the inside by cylindrical hollow middle column 3, which is concentric to wall 2, and by floor 4 below and silo ceiling 5 at the top. The material is introduced into silo area 1 through several ceiling openings 6 distributed along the circumference, to which openings the material is fed by suitable conveyor means 7. The silo exit is located at 8 in the center of the floor of the inner space 9 in the column 3. Worm pump 10 and pneumatic conveyor line 11 are connected to silo exit 8. the material can be fed back to silo area 1 from this line over a second line 12 as an alternative. A carrier structure 13, which can extend essentially radially, is guided on center column 3 and if necessary also on outer wall 2 and travels radially, for example, is located in silo area 1 over the stored material, can be raised and lowered and can be guided in a circle around column 3 over the stored material. It carries a radial conveyor worm 14 which is driven in such a manner during the operation of emptying that it mechanically removes parts from the surface of the stored material anc conveys them toward the center of the silo to column 3. Shovel scraper 15 rotates continuously in the immediate vicinity of column 3 at the same height as worm 4 or a little lower. This scraper circulates the material brought by worm 14 around the column. The column contains a plurality of openings 16 which are distributed over its height, are arranged in a helical series and overlap in height, so that at least one opening is available at each work level. It is advantageous if three helical series of such openings staggered by 120° are provided. Aeration devices 17 of a known type are provided in the lower soffits of the openings. The exiting air makes it easier for the loose material to pass from silo area 1 into inner space 9 of the column. Moreover, part of the air exits from the openings out into the silo area, which results in a loosening of the material located in the vicinity of the column and in particular in the range of revolving scraper 15. Instead of this or in addition thereto, aeration devices can be provided on the outer circumference of the column at a distance from openings 16. Scraper 15 as such can also be equipped with aeration devices. Finally, aeration devices 18 are advantageously provided on the floor of the inner space in the column. Their aeration strength depends on the method desired.

The first embodiment of the invention shown in FIG. 1 operates as follows.

Silo main storage area 1 is filled in a customary manner by loading devices 6, 7, while conveyor 13, 14, 15 is advantageously located in its highest possible position. Inner space 9 is also filled thereby through openings 16. It can subsequently be emptied by removal devices 8 and 10 as well as by transfer line 12 in order to prevent the material in it from solidifying so strongly that the emptying path would be difficult to clear later. At the start of the emptying, a sufficient loosening of the material in the vicinity of the openings 16 in silo main storage area 1 is first assured by heavily aerating the aeration device provided on the column circumference, especially the aeration devices 17 in openings 16. Then, the solidified material torn up by the conveyor is conveyed to the openings by actuating conveyor 14, 15. If inner space 9 has been emptied previously, the material falling down in column 3 can be removed through silo exit 8. If the column had been filled previously, it is previusly necessary to make the material in it flowable and to remove it by a strong actuation of loosening devices 17.

Figure 2:
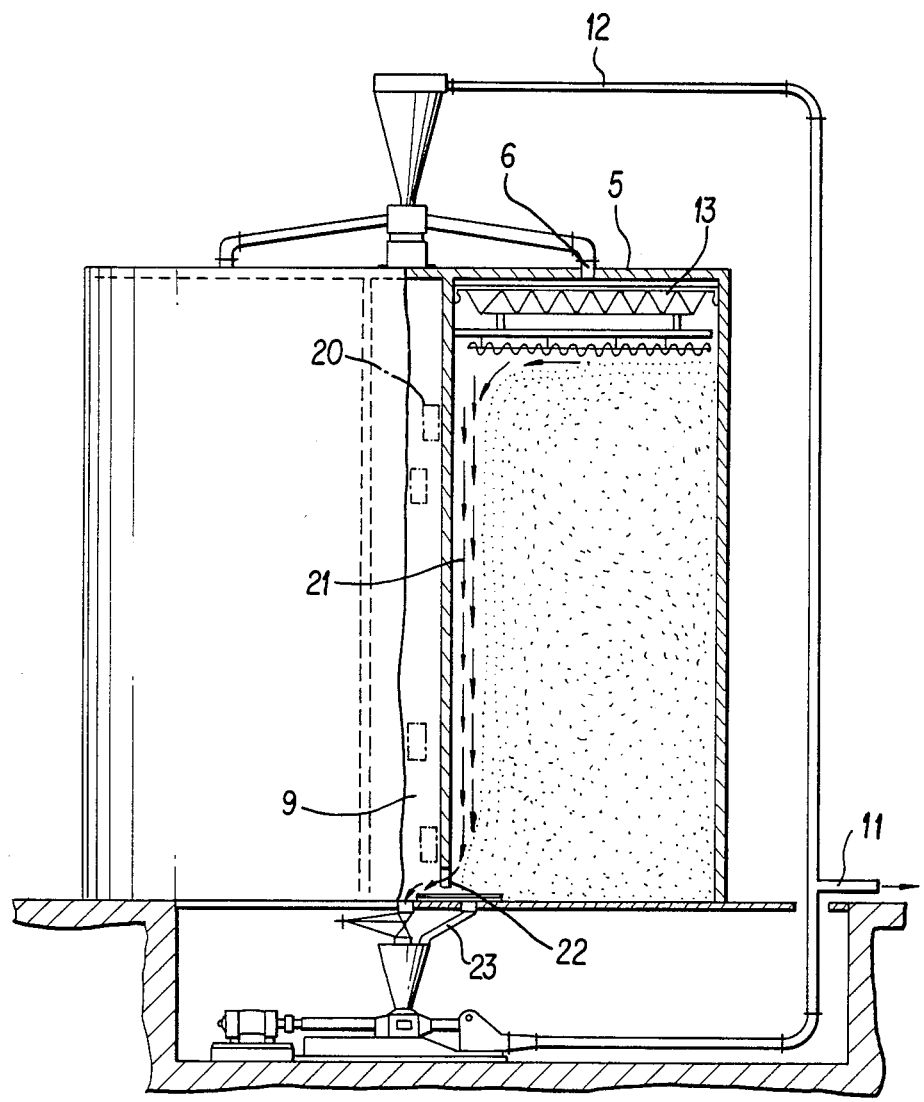
FIG. 2 shows the second embodiment of the invention, which shows at least one series of aeration devices located on the silo circumference running in a helix from the highest filled state of the silo to the silo floor.

In the second embodiment, which is shown in FIG. 2 of the drawing, at least one series of aeration devices 20 is located on the silo circumference, which series runs in a helix from the highest filled state of the silo to the silo floor. It is advantageous if a plurality of such series of aeration devices are provided, e.g., three series staggered on the circumference by 120° from each other. When these aeration devices are turned on at the start of the emptying, which is advantageously performed gradually from the top toward the bottom, whereby, as was described above, an especially heavy loading with compressed air can also occur first, a pneumatically fluizide channel 21 is cleared at least along the series of these aeration devices and in many instances over the entire circumference of column 3. The material loosened at the top by conveyor 14, 15 and carried to the column can flow down through this channel, where it can either pass through column opening 22 into the inside of the column to silo exit 8 or be removed directly through silo exit 23 provided outside the column.

This invention is not limited to the preferred embodiments and alternatives heretofore described, to which variations and improvements may be made, consisting of mechanically and electrically equivalent modifications to component parts and procedures without leaving the scope of the present patent, the characteristics of which are summarized in the following claims.

What is claimed is:

1. A silo system characterized by a floor and a ceiling for storing solidifying loose material, especially flue ash, comprising:
    a silo enclosing a main storage area with at least one opening in said ceiling of said silo whereby to allow loading material into said silo and having a silo exit in said floor of said silo whereby material is removed;
    a hollow column located over said silo exit and having in the walls of said column a plurality of slideless openings communicating between said main storage area and the hollow center of said column;
    conveyor means adapted and constructed to strip part of said materials from the upper surface of said stored materials and convey said stripped materials to said openings in said hollow column; and
    aeration devices located in the main storage area, and beneath each of said openings into said hollow column.

2. A silo system as in claim 1 additionally comprising a pneumatic conveyor system for conveying the material in said hollow column into the main silo area.

3. A silo system characterized by a floor and a ceiling for storing solidifying loose material, especially flue ash, comprising:
    a silo enclosing a main storage area with at least one opening in said ceiling of said silo whereby to allow loading material into said silo and having a silo exit in said floor of said silo whereby material is removed;
    a hollow column located over said silo exit and having in the walls of said column a slideless passage opening near the floor communicating between said main storage area and the hollow center of said column;
    conveyor means adapted and constructed to strip materials from the upper surface of said materials and convey said stripped materials to said hollow column; and
    aeration devices located in said main storage area, and at least one series of aeration devices on the silo hollow column circumference in a helical distribution.

4. A silo system as in claim 3 wherein said helical distribution is staggered in three series on the circumference of said column by 120° from each other so that said aeration devices may be turned on in sequence from top to bottom at the start of unloading operations.

5. A silo system as in claims 1, 3, or 4 additionally comprising strong pneumatic loosening devices inside said hollow column.

* * * * *